United States Patent
Taniguchi et al.

(10) Patent No.: US 10,165,220 B2
(45) Date of Patent: Dec. 25, 2018

(54) RECORDING APPARATUS AND CONTROL METHOD OF THE SAME

(71) Applicant: CANON KABUSHIKI KAISHA, Tokyo (JP)

(72) Inventors: Manabu Taniguchi, Tsukubamirai (JP); Keiichi Inoue, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/676,163

(22) Filed: Apr. 1, 2015

(65) Prior Publication Data

US 2015/0288915 A1     Oct. 8, 2015

(30) Foreign Application Priority Data

Apr. 2, 2014 (JP) .................... 2014-076465

(51) Int. Cl.
| | |
|---|---|
| *H04N 5/77* | (2006.01) |
| *H04N 5/91* | (2006.01) |
| *H04N 5/765* | (2006.01) |
| *H04N 5/232* | (2006.01) |

(52) U.S. Cl.
CPC ........... *H04N 5/77* (2013.01); *H04N 5/23245* (2013.01); *H04N 5/765* (2013.01); *H04N 5/772* (2013.01); *H04N 5/91* (2013.01)

(58) Field of Classification Search
CPC ............... H04N 5/765; H04N 21/4223; H04N 21/44231; H04N 21/43622; H04N 21/4135
USPC ........................................................ 386/224
See application file for complete search history.

(56) References Cited

U.S. PATENT DOCUMENTS

| | | | | |
|---|---|---|---|---|
| 6,154,210 A | * | 11/2000 | Anderson | ............... G03B 17/02 715/840 |
| 7,319,490 B2 | * | 1/2008 | Kanamori | ............... H04N 5/232 200/313 |
| 2005/0036034 A1 | * | 2/2005 | Rea | .................... H04N 1/00281 348/207.1 |

(Continued)

FOREIGN PATENT DOCUMENTS

| | | |
|---|---|---|
| JP | 2003-264729 A | 9/2003 |
| JP | 2005-033630 A | 2/2005 |

(Continued)

OTHER PUBLICATIONS

The above foreign patent documents were cited in the Feb. 23, 2018 Japanese Office Action, which is enclosed without an English Translation, that issued in Japanese Patent Application No. 2014076465.

*Primary Examiner* — Gelek W Topgyal
(74) *Attorney, Agent, or Firm* — Cowan, Liebowitz & Latman, P.C.

(57) ABSTRACT

A recording apparatus comprises a recording unit configured to record a moving image to a recording medium; a communication unit configured to communicate with an external apparatus; an input unit configured to accept a predetermined instruction; and a control unit configured to perform control such that, in a case where the predetermined instruction is accepted by the input unit during recording of a moving image by the recording unit, a moving image portion for which recording ended is automatically transferred to the external apparatus in accordance with ending of recording of a predetermined unit of the moving image.

9 Claims, 12 Drawing Sheets

(56) References Cited

U.S. PATENT DOCUMENTS

| | | | |
|---|---|---|---|
| 2006/0209196 A1* | 9/2006 | Ohtsuka | H04N 5/772 348/231.99 |
| 2006/0210254 A1* | 9/2006 | Yamashita | H04N 5/765 386/228 |
| 2006/0244847 A1* | 11/2006 | Nagaoka | G11B 27/034 348/231.99 |
| 2006/0245751 A1* | 11/2006 | Nagaoka | G11B 20/10 396/439 |
| 2007/0040892 A1* | 2/2007 | Aoki | H04N 7/147 348/14.01 |
| 2007/0058952 A1* | 3/2007 | Liu | G11B 27/034 386/230 |
| 2007/0122106 A1* | 5/2007 | Ohnishi | G11B 27/107 386/296 |
| 2007/0130600 A1* | 6/2007 | Yanai | G08B 13/19676 725/105 |
| 2007/0201864 A1* | 8/2007 | Shinkai | G11B 27/034 396/429 |
| 2009/0041430 A1* | 2/2009 | Ishizaka | G11B 27/329 386/326 |
| 2009/0238539 A1* | 9/2009 | Isobe | G11B 27/034 386/248 |
| 2010/0020175 A1* | 1/2010 | Takada | H04N 5/76 348/148 |
| 2010/0297939 A1* | 11/2010 | Fujita | H04W 4/00 455/41.1 |
| 2011/0222832 A1* | 9/2011 | Aizawa | G11B 19/025 386/200 |
| 2013/0044992 A1* | 2/2013 | Boland | H04N 5/23203 386/224 |
| 2013/0235215 A1* | 9/2013 | Okada | H04N 5/225 348/207.1 |
| 2014/0010517 A1* | 1/2014 | Sheffler | H04N 9/79 386/226 |

FOREIGN PATENT DOCUMENTS

| | | |
|---|---|---|
| JP | 2006-014179 A | 1/2006 |
| JP | 2007-081739 A | 3/2007 |
| JP | 2013-051607 A | 3/2013 |
| JP | 2013-214346 A | 10/2013 |

* cited by examiner

FIG. 5A

| | 5010 | 5011 | 5012 |
|---|---|---|---|
| 5000 — SCENE NUMBER[0] | FILE NUMBER[0][0] | FILE NUMBER[0][1] | FILE NUMBER[0][...] |
| 5020 — SCENE NUMBER[1] | FILE NUMBER[1][0] | FILE NUMBER[1][1] | FILE NUMBER[1][...] |
| 5030 — SCENE NUMBER[2] | FILE NUMBER[2][0] | FILE NUMBER[2][1] | FILE NUMBER[2][...] |
| ⋮ SCENE NUMBER | ⋮ FILE NUMBER | ⋮ FILE NUMBER | ⋮ FILE NUMBER |
| | 5031 | 5021 5032 | 5022 |

FIG. 5B

| | 5101 | 5102 |
|---|---|---|
| 5100 — SCENE NUMBER[0]:Scene#1 | SCENE NUMBER[0][0]:File#1 | SCENE NUMBER[0][1]:FileClose | SCENE NUMBER[0][2]:UNREGISTERED |
| SCENE NUMBER[1]:UNREGISTERED | SCENE NUMBER[1][0]:UNREGISTERED | SCENE NUMBER[1][1]:UNREGISTERED | SCENE NUMBER[1][2]:UNREGISTERED |
| SCENE NUMBER[2]:UNREGISTERED | SCENE NUMBER[2][0]:UNREGISTERED | SCENE NUMBER[2][1]:UNREGISTERED | SCENE NUMBER[2][2]:UNREGISTERED |
| SCENE NUMBER[3]:UNREGISTERED | SCENE NUMBER[3][0]:UNREGISTERED | SCENE NUMBER[3][1]:UNREGISTERED | SCENE NUMBER[3][2]:UNREGISTERED |
| SCENE NUMBER[4]:UNREGISTERED | SCENE NUMBER[4][0]:UNREGISTERED | SCENE NUMBER[4][1]:UNREGISTERED | SCENE NUMBER[4][2]:UNREGISTERED |

FIG. 5C

| | 5211 | 5212 |
|---|---|---|
| 5200 — SCENE NUMBER[0]:Scene#1 | SCENE NUMBER[0][0]:File#1 | SCENE NUMBER[0][1]:FileClose | SCENE NUMBER[0][2]:UNREGISTERED |
| 5210 — SCENE NUMBER[1]:Scene#2 | SCENE NUMBER[1][0]:File#2 | SCENE NUMBER[1][1]:FileClose | SCENE NUMBER[1][2]:UNREGISTERED |
| SCENE NUMBER[2]:UNREGISTERED | SCENE NUMBER[2][0]:UNREGISTERED | SCENE NUMBER[2][1]:UNREGISTERED | SCENE NUMBER[2][2]:UNREGISTERED |
| SCENE NUMBER[3]:UNREGISTERED | SCENE NUMBER[3][0]:UNREGISTERED | SCENE NUMBER[3][1]:UNREGISTERED | SCENE NUMBER[3][2]:UNREGISTERED |
| SCENE NUMBER[4]:UNREGISTERED | SCENE NUMBER[4][0]:UNREGISTERED | SCENE NUMBER[4][1]:UNREGISTERED | SCENE NUMBER[4][2]:UNREGISTERED |

FIG. 5D

| SCENE NUMBER[0][0]:Scene#1 | SCENE NUMBER[0][1]:File#1 | SCENE NUMBER[0][2]:UNREGISTERED |
|---|---|---|
| SCENE NUMBER[1][0]:Scene#2 | SCENE NUMBER[1][1]:File#2 | SCENE NUMBER[1][2]:UNREGISTERED |
| SCENE NUMBER[2][0]:Scene#3 | SCENE NUMBER[2][1]:File#3 | SCENE NUMBER[2][2]:UNREGISTERED |
| SCENE NUMBER[3][0]:UNREGISTERED | SCENE NUMBER[3][1]:UNREGISTERED | SCENE NUMBER[3][2]:UNREGISTERED |
| SCENE NUMBER[4][0]:UNREGISTERED | SCENE NUMBER[4][1]:UNREGISTERED | SCENE NUMBER[4][2]:UNREGISTERED |

FIG. 5E

| SCENE NUMBER[0][0]:Scene#1 | SCENE NUMBER[0][1]:FileClose | SCENE NUMBER[0][2]:UNREGISTERED |
|---|---|---|
| SCENE NUMBER[1][0]:Scene#2 | SCENE NUMBER[1][1]:FileClose | SCENE NUMBER[1][2]:UNREGISTERED |
| SCENE NUMBER[2][0]:Scene#3 | SCENE NUMBER[2][1]:File#4 | SCENE NUMBER[2][2]:UNREGISTERED |
| SCENE NUMBER[3][0]:UNREGISTERED | SCENE NUMBER[3][1]:UNREGISTERED | SCENE NUMBER[3][2]:UNREGISTERED |
| SCENE NUMBER[4][0]:UNREGISTERED | SCENE NUMBER[4][1]:UNREGISTERED | SCENE NUMBER[4][2]:UNREGISTERED |

FIG. 5F

| SCENE NUMBER[0][0]:Scene#1 | SCENE NUMBER[0][1]:FileClose | SCENE NUMBER[0][2]:UNREGISTERED |
|---|---|---|
| SCENE NUMBER[1][0]:Scene#2 | SCENE NUMBER[1][1]:FileClose | SCENE NUMBER[1][2]:UNREGISTERED |
| SCENE NUMBER[2][0]:Scene#3 | SCENE NUMBER[2][1]:File#4 | SCENE NUMBER[2][2]:UNREGISTERED |
| SCENE NUMBER[3][0]:Scene#4 | SCENE NUMBER[3][1]:File#5 | SCENE NUMBER[3][2]:UNREGISTERED |
| SCENE NUMBER[4][0]:UNREGISTERED | SCENE NUMBER[4][1]:UNREGISTERED | SCENE NUMBER[4][2]:UNREGISTERED |

FIG. 5G

| | | | 5632 | |
|---|---|---|---|---|
| SCENE NUMBER[0]:Scene#1 | SCENE NUMBER[0][0]:File#1 | | SCENE NUMBER[0][1]:FileClose | SCENE NUMBER[0][2]:UNREGISTERED |
| SCENE NUMBER[1]:Scene#2 | SCENE NUMBER[1][0]:File#2 | | SCENE NUMBER[1][1]:FileClose | SCENE NUMBER[1][2]:UNREGISTERED |
| SCENE NUMBER[2]:Scene#3 | SCENE NUMBER[2][0]:File#3 | | SCENE NUMBER[2][1]:File#4 | SCENE NUMBER[2][2]:FileClose |
| SCENE NUMBER[3]:Scene#4 | SCENE NUMBER[3][0]:File#5 | | SCENE NUMBER[3][1]:File#6 | SCENE NUMBER[3][2]:UNREGISTERED |
| SCENE NUMBER[4]:UNREGISTERED | SCENE NUMBER[4][0]:UNREGISTERED | | SCENE NUMBER[4][1]:UNREGISTERED | SCENE NUMBER[4][2]:UNREGISTERED |

FIG. 5H

| 5740 | 5741 | 5742 | 5743 |
|---|---|---|---|
| SCENE NUMBER[0]:Scene#1 | SCENE NUMBER[0][0]:File#1 | SCENE NUMBER[0][1]:FileClose | SCENE NUMBER[0][2]:UNREGISTERED |
| SCENE NUMBER[1]:Scene#2 | SCENE NUMBER[1][0]:File#2 | SCENE NUMBER[1][1]:FileClose | SCENE NUMBER[1][2]:UNREGISTERED |
| SCENE NUMBER[2]:Scene#3 | SCENE NUMBER[2][0]:File#3 | SCENE NUMBER[2][1]:File#4 | SCENE NUMBER[2][2]:FileClose |
| SCENE NUMBER[3]:Scene#4 | SCENE NUMBER[3][0]:File#5 | SCENE NUMBER[3][1]:File#6 | SCENE NUMBER[3][2]:FileClose |
| SCENE NUMBER[4]:Scene#5 | SCENE NUMBER[4][0]:File#7 | SCENE NUMBER[4][1]:File#8 | SCENE NUMBER[4][2]:FileClose | ns
RECORDING APPARATUS AND CONTROL METHOD OF THE SAME

BACKGROUND OF THE INVENTION

Field of the Invention

The present invention relates to a technique for transferring data to an external apparatus.

Description of the Related Art

In video cameras of recent years, extended-length video recording has been realized by not only providing a removable memory card slot, but also separately providing a 32 GB flash memory or 120 GB HDD (Hard Disk Drive) as an internal memory. Also, video cameras of recent years have included a wireless communication function such as Wi-Fi, and can exchange data with external apparatuses such as PCs and mobile terminals (smartphones, tablets, etc.).

Examples of data transfer systems include FTP, HTTP, and RTP, and FTP is often used when transferring moving image data captured by a video camera, for example. The video camera operates as the FTP client and, via FTP commands, transfers data to a PC, mobile terminal, or the like that has an FTP server function (e.g., see Japanese Patent Laid-Open No. 2003-264729 and Japanese Patent Laid-Open No. 2007-081739).

Japanese Patent Laid-Open No. 2003-264729 discloses a technique in which image data recorded on a recording medium is automatically transferred to an external apparatus in an operating mode other than the shooting mode, but unsuccessful photos are also automatically transferred.

Also, Japanese Patent Laid-Open No. 2007-081739 discloses a technique in which the user can view a preview screen and select images that they wish to transfer, but the screen needs to be switched to the preview screen in order to select images, which is lacking in operability, and images cannot be transferred during shooting.

SUMMARY OF THE INVENTION

The present invention has been made in consideration of the aforementioned problems, and realizes a technique that enables immediately and easily performing operations regarding processing for transferring video data that is being captured or has been captured.

In order to solve the aforementioned problems, the present invention provides a recording apparatus comprising: a recording unit configured to record a moving image to a recording medium; a communication unit configured to communicate with an external apparatus; an input unit configured to accept a predetermined instruction; and a control unit configured to perform control such that, in a case where the predetermined instruction is accepted by the input unit during recording of a moving image by the recording unit, a moving image portion for which recording ended is automatically transferred to the external apparatus in accordance with ending of recording of a predetermined unit of the moving image.

In order to solve the aforementioned problems, the present invention provides a control method of a recording apparatus which has a recording unit configured to record a moving image to a recording medium, a communication unit configured to communicate with an external apparatus, and an input unit configured to accept a user operation, the method comprising: accepting a predetermined instruction with the input unit; and performing control such that, in a case where the predetermined instruction is accepted by the input unit during recording of a moving image by the recording unit, a moving image portion for which recording ended is automatically transferred to the external apparatus in accordance with ending of recording of a predetermined unit of the moving image.

According to the present invention, it is possible to immediately and easily perform operations regarding processing for transferring video data that is being captured or has been captured.

Further features of the present invention will become apparent from the following description of exemplary embodiments with reference to the attached drawings.

BRIEF DESCRIPTION OF THE DRAWINGS

FIGS. 5A to 5H are diagrams illustrating examples of a transfer list according to the first embodiment.

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

First Embodiment

The following describes an example in which an image recording apparatus of the present invention is applied to an image capturing apparatus in a digital video camera (hereinafter, simply "video camera") that can shoot moving images and still images, for example. Note that the present invention is also applicable to a mobile electronic device such as a smartphone or tablet equipped with a digital still camera or camera function capable of shooting moving images.

Apparatus Configuration

An overview of the configuration and functions of a video camera according to an embodiment of the present invention will be described below with reference to FIG. 1. Note that the terms "moving image data" and "audio-containing moving image data" used below refer to video data.

Figure 1:
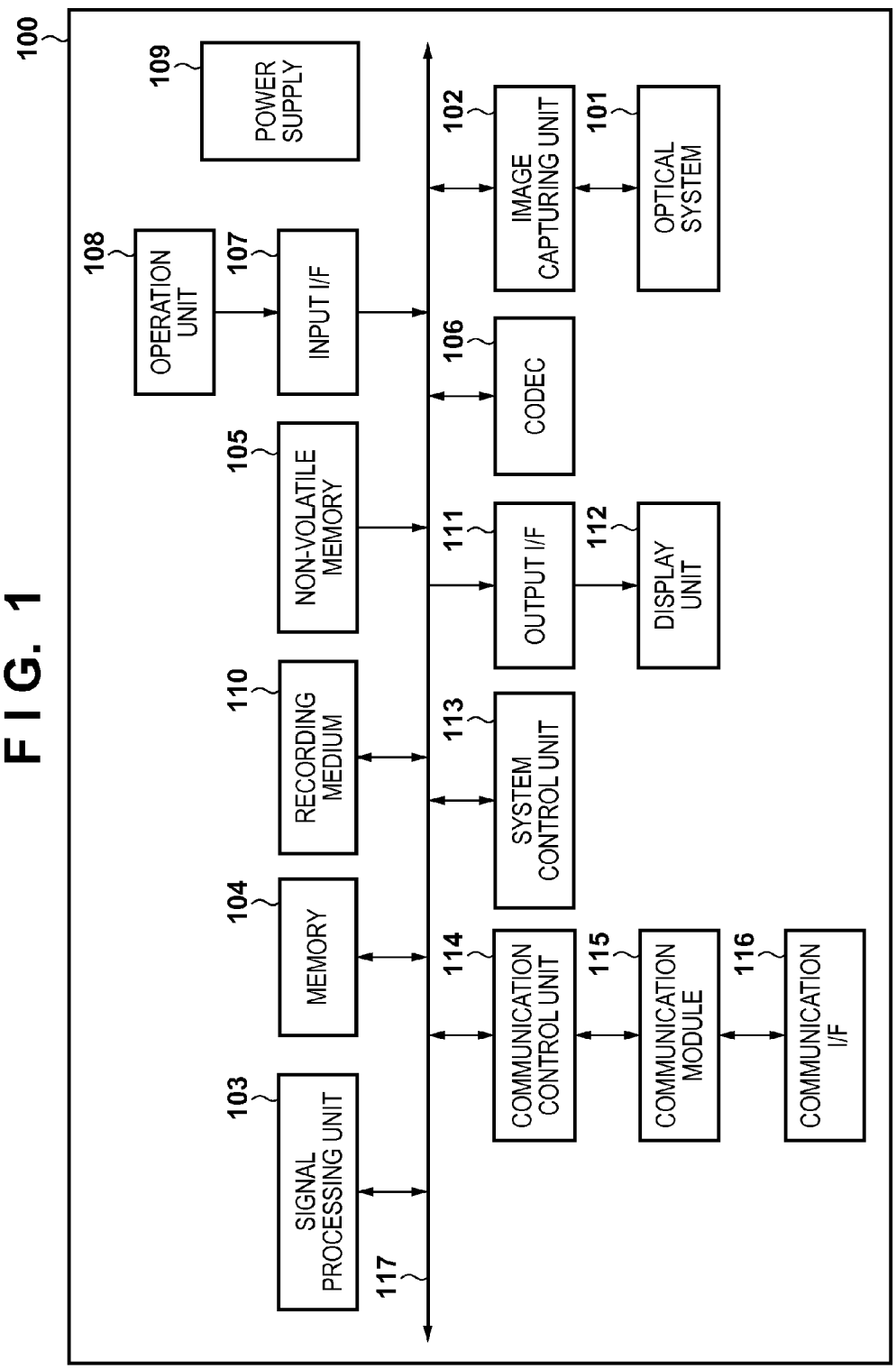
FIG. 1 is a block diagram showing a configuration of a video camera according to an embodiment of the present invention.

In FIG. 1, an optical system 101 comprises a shutter having an aperture function, and a lens group including a zoom lens and a focusing lens. The image capturing unit 102 is an image sensor constituted by a CCD, a CMOS, or the like that converts a subject image into an electrical signal. The image capturing unit 102 includes an A/D converter that converts analog signals output from the image sensor into digital signals.

A signal processing unit 103 performs various types of signal processing on video data that was captured by the image capturing unit 102 and stored in a memory 104, such as predetermined pixel interpolation, resizing, color correction, and gamma processing.

A codec 106 generates a video file by compressing and encoding the video data resulting from the aforementioned correction processing into a predetermined bitrate and format, such as MPEG4 AVC or H.264, and records the video file to a recording medium 110. The codec 106 also decodes a video file recorded on the recording medium 110 into a predetermined bitrate and format, and stores the decoded video file in the memory 104. Note that although not shown, a video camera 100 of the present embodiment includes a microphone for collecting surrounding audio, and the signal processing unit 103 performs known encoding processing such as AAC on audio signals received from the microphone. The codec 106 generates audio-containing moving image data by multiplexing received audio data with the video data during video recording.

Video data that has been decoded by the codec 106 and stored in the memory 104 is output to an output I/F 111 and displayed on a display unit 112, and the audio data is output from a speaker (not shown).

The memory 104 stores video data output from the image capturing unit 102 and audio data output from the microphone. In addition to video data and audio data, the memory 104 also stores various types of information such as file system information and management information, and furthermore serves as a work memory for control performed by a system control unit 113, for example. The memory 104 further serves as a buffer memory during video recording and reproduction. Note that the work area used by the system control unit 113 is not limited to the memory 104, and may be a later-described external hard disk, memory card, or the like.

The recording medium 110 is a memory card, hard disk drive, or the like mounted to the video camera 100, or a flash memory or hard disk drive built into the video camera 100. Video data stored in the memory 104 is recorded to the recording medium 110, and previously recorded video files and various types of information related to camera control are read out from the recording medium 110.

A power supply 109 comprises a primary cell such as an alkaline battery, a secondary cell such as a NiCd battery, NiMH battery, or Li ion battery, an AC adapter or the like, and supplies necessary power to the units of the video camera 100.

An operation unit 108 includes switches, cursor keys, a touch panel, and the like for giving instructions regarding turning the power supply on/off, starting/stopping video recording, performing later-described transfer designation, shooting still images, performing zoom operations, switching the operating mode, displaying menu screens, and the like.

An input I/F (interface) 107 inputs operation signals from the operation unit 108 thereby accepting various instructions corresponding to user operations, and outputs the operation signals to a data bus 117.

A non-volatile memory 105 is, for example, an EEPROM that can be electrically erased and recorded to. Constants for operations performed by the system control unit 113, programs, and the like are stored in the non-volatile memory 105. The programs referred to here are programs for executing various flowcharts that will be described later.

The output I/F (interface) 111 outputs, to the display unit 112, video data decoded by the codec 106, and display signals corresponding to OSD data such as GUIs (Graphical User Interfaces) generated by the system control unit 113.

The system control unit 113 has a CPU, an input/output circuit, a timer circuit, and the like, and controls overall operation of the apparatus by the CPU loading the programs stored in the non-volatile memory 105 to the work area in the memory 104 and executing the programs.

A communication control unit 114 performs wired communication or wireless communication with an external apparatus such as an FTP server via a communication module 115 and a communication I/F (interface) 116, and performs the transmission and reception of control data, video data, and audio data. The communication control unit 114 need only be able to exchange information with an external apparatus using a communication protocol such as TCP/IP, and applicable examples include the Internet, a LAN, a WAN, and other networks. The communication module 115 is a wireless communication module for Wi-Fi, Bluetooth (registered trademark), or the like, or a wired communication module for Ethernet (registered trademark), USB, or the like.

Figure 2:
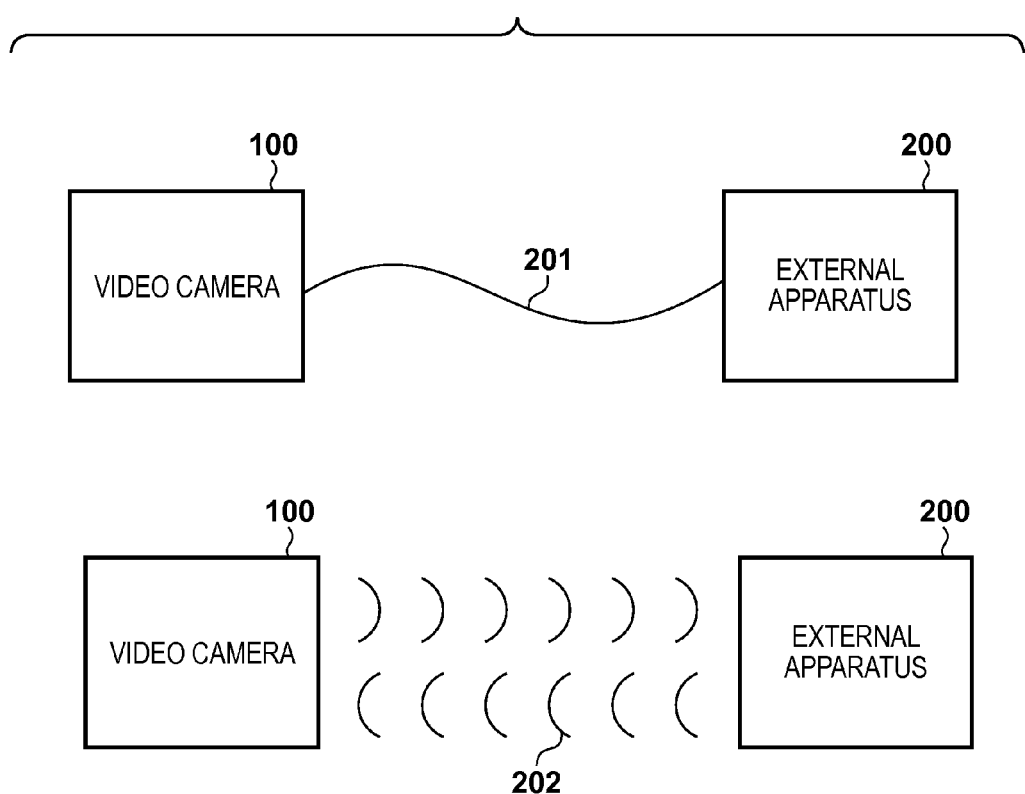
FIG. 2 is a diagram illustrating examples of modes of communication between an external apparatus and a video camera according to an embodiment of the present invention.

The following describes modes of communication between the video camera 100 of the present embodiment and an external apparatus 200 with reference to FIG. 2.

FIG. 2A illustratively shows a mode in which the video camera 100 of the present embodiment and the external apparatus 200 are communicatably connected by a wired communication module 201. Note that an apparatus that directly communicates with the video camera 100, or an apparatus connected thereto via a relay apparatus such as a network hub can be applied as the external apparatus 200.

FIG. 2B illustratively shows a mode in which the video camera 100 of the present embodiment and the external apparatus 200 are communicatably connected by a wireless communication module 202. Note that an apparatus that directly communicates with the video camera 100, or an apparatus connected thereto via a relay apparatus such as an access point can be applied as the external apparatus 200.

The system control unit 113 manages video files that are to be recorded in a video recording operation, which will be described later using FIG. 3, using scene information that indicates video scenes and file information that indicates files constituting the scenes. The system control unit 113 can carry out general processing such as file generation processing including later-described "FileBreak" and "FileClose"; processing for acquiring information regarding file generation processing; control during video recording (change to currently recording state or recording preparation state); information list management; and update processing.

The system control unit 113 also performs later-described transfer list registration processing. In transfer list registration processing, when a user selects a video file from a file list or the like displayed on the display unit 112, the system control unit 113 reads out the selected video file from the recording medium 110, and transfers it to an external apparatus via the communication control unit 114. In transfer list registration processing, scene information indicating the transfer target scene number or the like and file information indicating the file numbers of the files constituting the transfer target scene or the like are registered in a later-described transfer list shown in FIG. 5A by the system control unit 113.

The data bus 117 functions as a transmission path for the transmission of various types of data, control information, and the like between the blocks of the video camera 100.

Video Recording Operation

Next, a video recording operation performed by the video camera 100 of the present embodiment will be described with reference to FIG. 3.

Figure 3:
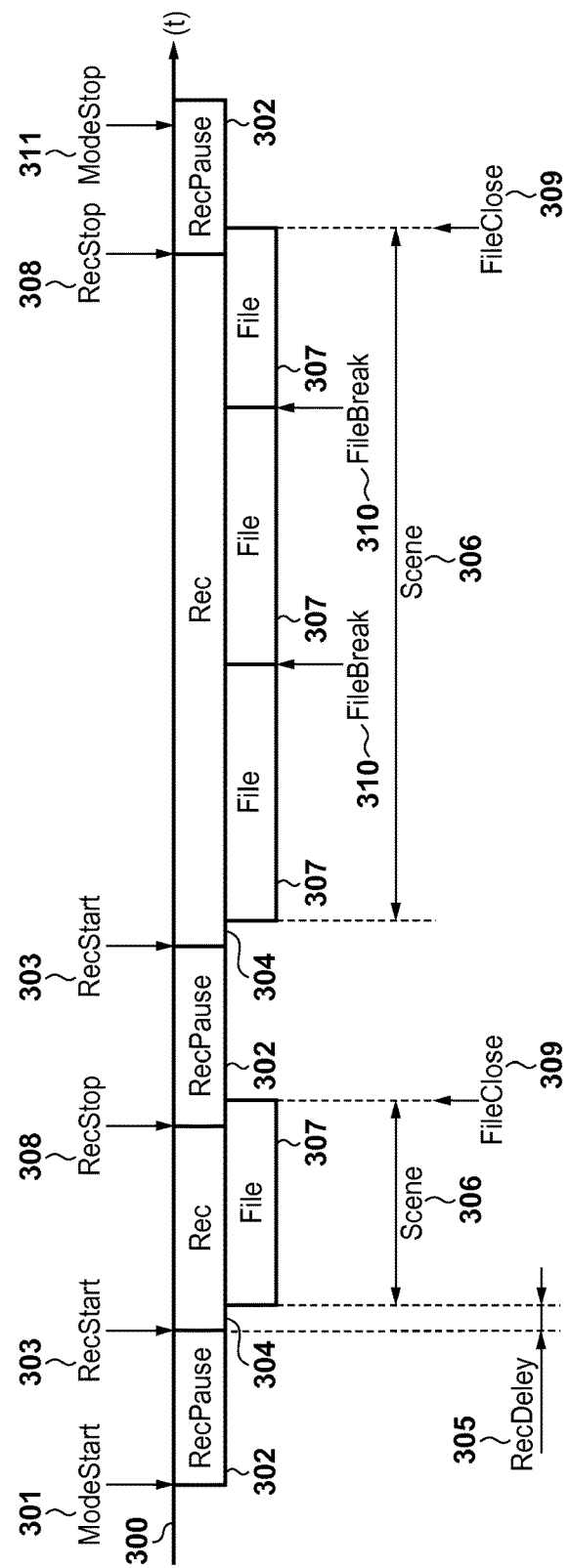
FIG. 3 is a timing chart showing a video recording operation performed by a video camera according to an embodiment of the present invention.

FIG. 3 is a timing chart for when the video camera 100 of the present embodiment performs the video recording operation.

A time axis 300 in FIG. 3 represents the elapse of time (t) from left to right.

ModeStart 301 indicates the time when a user performs an operation on the operation unit 108, via a user interface (UI) or the like, for shifting the video camera 100 to a video recording mode. When the operation for switching to the video recording mode is performed, the video camera 100 shifts to the later-described recording preparation state.

RecPause 302 indicates the recording preparation state, which is a standby state of the video camera 100 before the start of video recording or after the end of video recording. The recording preparation state is a state in which the video camera 100 can immediately start the recording operation when a recording start instruction (RecStart) is received from the operation unit 108.

RecStart 303 indicates the time when the user gives a recording start instruction using the operation unit 108, via a user interface (UI) or the like, to the video camera 100. When this recording start instruction (RecStart) is received, the video camera 100 causes the video signal successively captured by the optical system 101 and the image capturing unit 102 to be encoded by the codec 106 into a file format for recording to the recording medium 110, and stores the encoded video signal in the memory 104. Each time the data size of the file stored in the memory 104 reaches a maximum file size that can be recorded to the recording medium 110 for that file format (hereinafter, simply "FB capacity"), the file is recorded to the recording medium 110. This processing is repeated until a recording stop instruction (RecStop) is received from the operation unit 108.

Rec 304 indicates the currently recording state of the video camera 100. The currently recording state is a state in which a recording start instruction (RecStart) has been received from the operation unit 108, and the video camera 100 continues the above-described recording operation until a recording stop instruction (RecStop) is received.

RecDelay 305 indicates the time delay from when the recording start instruction (RecStart) is received from the operation unit 108 and the video camera 100 starts the recording operation, until when a video file is actually recorded to the recording medium 110. This time delay changes according to the FB capacity and the bitrate of the video data to be recorded. Note that a similar time delay arises from when the recording stop instruction (RecStop) is received until when the video recording operation actually ends.

Scene 306 indicates the series of video data files recorded between the recording start instruction (RecStart) and the recording stop instruction (RecStop). It should be noted that this does not mean the same thing as a later-described file 307. When video files are recorded to the recording medium 110, each time the data size of the video file stored in the memory 104 reaches the FB capacity, the video file needs to be divided and recorded. Processing in which a video data series is divided and recorded each time a predetermined data size is reached is called FileBreak 310. Accordingly, one scene 306 is defined as being comprised of all of the files 307 generated by FileBreak 310 between the recording start instruction and stop instruction. Note that scene 306 is given a number each time a recording start instruction (RecStart) is received, such as Scene#1, Scene#2, and so on.

File 307 indicates one video file recorded between a recording start instruction (RecStart) and stop instruction (RecStop), or individual video files resulting from the video file being divided and recorded by FileBreak 310. After a recording start instruction (RecStart) is received, each time the data size of the video file stored in the memory 104 reaches the FB capacity, a file 307 is generated and recorded to the recording medium 110. A file 307 is incomplete data until later-described FileClose 309 or FileBreak 310 is performed, and cannot be readout in other processing. Note that each time a file 307 is put into a complete state due to FileClose 309 or FileBreak 310, it is given a number, such as File#1, File#2, and so on.

RecStop 308 indicates the time when the user gives a recording stop instruction using the operation unit 108, via a user interface (UI) or the like, to the video camera 100. When this recording stop instruction (RecStop) is received, the video file stored in the memory 104 at that point in time is recorded to the recording medium 110, and then the video camera 100 shifts to the recording preparation state.

FileClose 309 indicates file generation processing for completing files 307 that are to be successively recorded to the recording medium 110. After this file close processing is executed, a file 307 can be read out and edited in other processing.

FileBreak 310 indicates file generation processing in which a video file currently being recorded is divided and recorded each time a predetermined data size is reached. In this filebreak processing, the system control unit 113 determines the maximum file size that can be recorded to the recording medium 110, and this filebreak processing is automatically performed in the video camera 100 in the currently recording state. If the user gives a recording start instruction (RecStart) only one time, even if the video recording time continues for longer than a predetermined time, FileBreak 310 is performed each time the data size of the video file currently being recorded reaches the FB capacity. The files 307 generated by FileBreak 310 are successively recorded to the recording medium 110, and the generation of a new file 307 is started each time recording is performed.

ModeStop 311 indicates the time when the user gives an instruction for ending the video recording mode from the operation unit 108 via a user interface (UI), that is to say, the time when an instruction for switching to another operating mode is given. When this instruction to switch from the video recording mode is received, the video camera 100 shifts to another operating mode, such as a reproduction mode.

Transfer Designation Processing

Next, video file transfer designation processing in the recording operation performed by the video camera 100 of the present embodiment will be described with reference to FIGS. 4A to 4E and FIGS. 5A to 5H.

FIGS. 4A to 4E are timing charts for the recording operation and video file transfer designation processing performed by the video camera 100 of the present embodiment. FIGS. 5A to 5H illustrate examples of lists in which files designated for transfer are registered in the recording operation examples shown in FIGS. 4A to 4E.

A time axis 4000 in FIGS. 4A to 4E represent the elapse of time (t) from left to right.

Figure 4A:
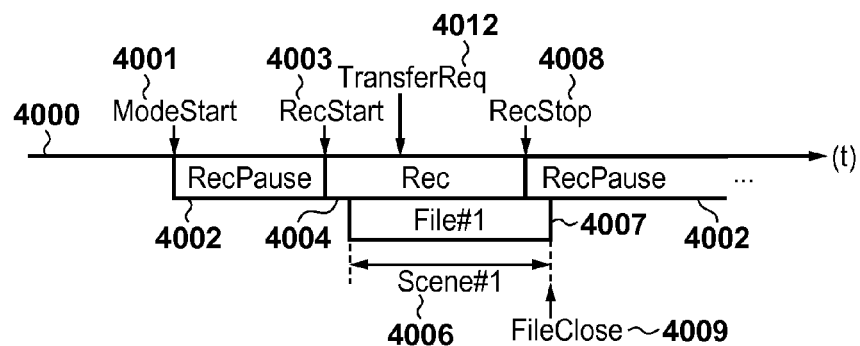
FIGS. 4A to 4E are timing charts showing transfer list registration processing according to a first embodiment.

FIG. 4A shows an operation for designating the transfer of a scene being recorded, and in this figure, ModeStart 4001, RecPause 4002, RecStart 4003, Rec 4004, Scene 4006, File 4007, RecStop 4008, and FileClose 4009 have the same meanings as ModeStart 301, RecPause 302, RecStart 303, Rec 304, Scene 306, File 307, RecStop 308, and FileClose 309 that were described with reference to FIG. 3.

Scene#1 (4006) corresponds to the scene when recording is first started at RecStart 4003, and is given the number "#1". Also, File#1 (4007) is the file that is first recorded to the recording medium 110 similarly to Scene#1 (4006), and is given the number "#1".

After RecStop 4008, FileClose 4009 is performed, and thus File#1 (4007) is completed.

TransferReq 4012 indicates the time when the user performs an operation on the operation unit 108, via a user interface (UI), for designating the transfer of Scene#1 (4006) currently being recorded in the video camera 100. Details of this transfer designation processing will be described later.

Figure 4B:
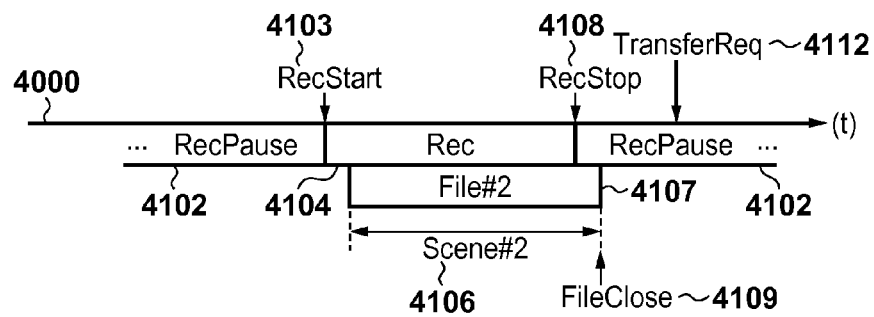

FIG. 4B indicates an operation in which a scene for which the recorded operation is complete is transferred to an external apparatus in the recording preparation state, and in this figure, RecPause 4102, RecStart 4103, Rec 4104, Scene 4106, File 4107, RecStop 4108, and FileClose 4109 have the same meanings as RecPause 302, RecStart 303, Rec 304, Scene 306, File 307, RecStop 308, and FileClose 309 that were described with reference to FIG. 3.

Scene#2 (4106) corresponds to the scene when recording is started the second time at RecStart 4103, and is given the number "#2". Also, File#2 (4107) is the file that is to be recorded to the recording medium 110 the second time similarly to Scene#2 (4106), and is given the number "#2".

After RecStop 4108, FileClose 4109 is performed, and thus File#2 (4107) is completed.

TransferReq 4112 indicates the time when the user performs an operation on the operation unit 108, via a user interface (UI), for designating the transfer of Scene#2 (4106) for which the recording operation was completed in the video camera 100. Details of this transfer designation processing will be described later.

Figure 4C:
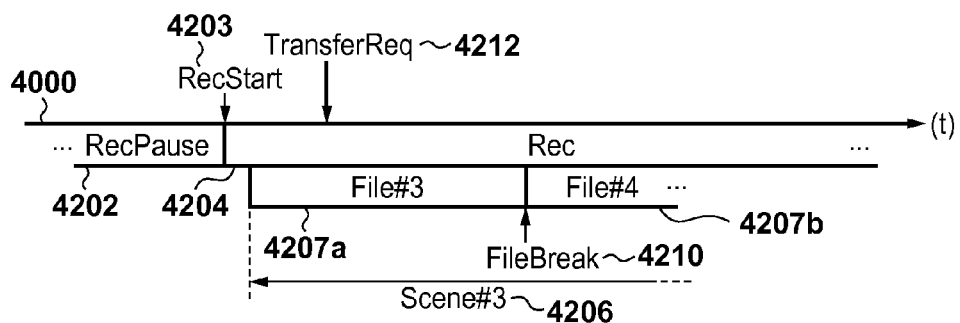

FIG. 4C indicates an operation for transferring a scene currently being recorded to an external apparatus before performing FileBreak, and RecPause 4202, RecStart 4203, Rec 4104, Scene 4206, Files 4207a to 4207b, and FileBreak 4210 have the same meanings as RecPause 302, RecStart 303, Rec 304, Scene 306, File 307, and FileBreak 310 that were described with reference to FIG. 3.

Scene#3 (4206) corresponds to the scene when recording is started the third time at RecStart 4203, and is given the number "#3". In Scene#3 (4206), FileBreak 4210 is performed on File#3 (4207a) during recording so as to complete File#3 (4207a), and then the generation of a new File#4 (4207b) is started.

File#3 (4207a) is the file that is to be recorded to the recording medium 110 the third time similarly to Scene#3 (4206), and thus is given the number "#3". File#4 (4207b) is the file that is generated after the completion of File#3 (4207a) that was subjected to FileBreak 4210 and is to be recorded to the recording medium 110 the fourth time, and thus is given the number "#4".

TransferReq 4212 indicates the time when the user performs an operation on the operation unit 108, via a user interface (UI), for designating the transfer of Scene#3 (4206) currently being recorded in the video camera 100. Details of this transfer designation processing will be described later.

Figure 4D:
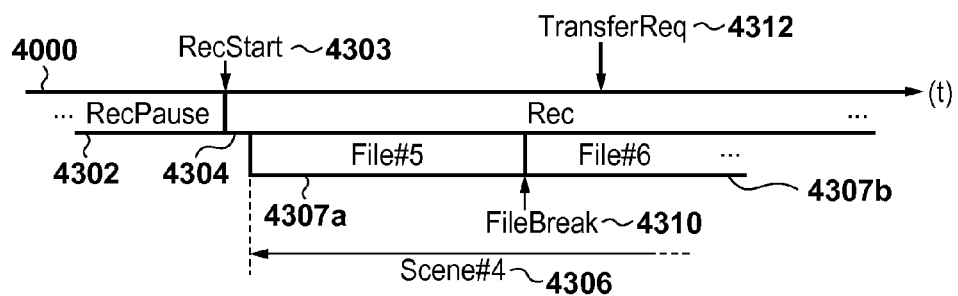

FIG. 4D indicates an operation for transferring a scene currently being recorded to an external apparatus after performing FileBreak, and RecPause 4302, RecStart 4303, Rec 4304, Scene 4306, Files 4307a to 4307b, and FileBreak 4310 have the same meanings as RecPause 302, RecStart 303, Rec 304, Scene 306, File 307, and FileBreak 310 that were described with reference to FIG. 3.

Scene#4 (4306) corresponds to the scene when recording is started the fourth time at RecStart 4303, and is given the number "#4". In Scene#4 (4306), FileBreak 4310 is performed on File#5 (4307a) during recording so as to complete File#5 (4307a), and then the generation of a new File#6 (4307b) is started.

File#5 (4307a) is the file that is to be recorded to the recording medium 110 the fifth time, and thus is given the number "#5". File#6 (4307b) is the file that is generated after the completion of File#5 (4307a) that was subjected to FileBreak 4310 and is to be recorded to the recording medium 110 the sixth time, and thus is given the number "#6".

TransferReq 4312 indicates the time when the user performs an operation on the operation unit 108, via a user interface (UI), for designating the transfer of Scene#4 (4306) currently being recorded in the video camera 100. Details of this transfer designation processing will be described later.

Figure 4E:
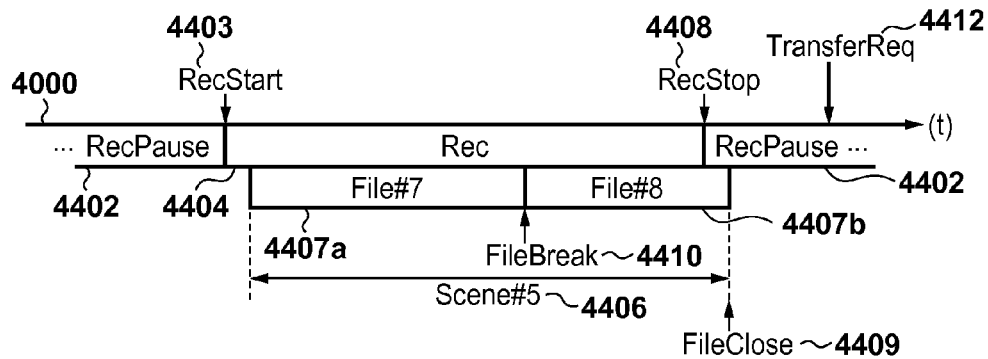

FIG. 4E shows an operation in which a scene for which the recording operation was completed by the execution of FileBreak is transferred to an external apparatus in the subsequent recording preparation state, and RecPause 4402, RecStart 4403, Rec 4404, Scene 4406, Files 4407a to 4407b, RecStop 4408, FileClose 4409, and FileBreak 4410 have the same meanings as RecPause 302, RecStart 303, Rec 304, Scene 306, File 307, RecStop 308, FileClose 309, and FileBreak 310 that were described with reference to FIG. 3.

Scene#5 (4406) corresponds to the scene when recording is started the fifth time at RecStart 4403, and is given the number "#5". In Scene#5 (4406), FileBreak 4410 is performed on File#7 (4407a) during recording so as to complete File#7 (4407a), and then the generation of a new File#8 (4407b) is started.

File#7 (4407a) is the file that is to be recorded to the recording medium 110 the seventh time, and thus is given the number "#7". File#8 (4407b) is the file that is generated after the completion of File#7 (4407a) that was subjected to FileBreak 4410 and is to be recorded to the recording medium 110 the eighth time, and thus is given the number "#8".

After RecStop 4408, FileClose 4409 is performed, and thus File#8 (4407b) is completed.

TransferReq 4412 indicates the time when the user performs an operation on the operation unit 108, via a user interface (UI), for designating the transfer of Scene#5 (4406) for which the recording operation was completed in the video camera 100. Details of this transfer designation processing will be described later.

Transfer List

Next, transfer lists in which files designated for transfer are registered in the recording operation examples shown in FIGS. 4A to 4E will be described with reference to FIGS. 5A to 5H.

As shown in FIG. 5A, a transfer list 5000 includes scene number registration tables 5010, 5020, 5030, and so on, and file number registration tables 5011, 5021, 5022, . . . , 5021, 5022, . . . , 5031, 5032, and so on. Scene numbers indicating video files designated for transfer are registered in the scene number registration tables, and file numbers indicating files constituting the corresponding scene are registered in the file number registration tables.

The number of scene number registration tables is determined according to the number of scenes designated for transfer. In the example shown in FIG. 5B, five scenes with scene numbers [0] to [4] can be registered as transfer targets. Also, when the transfer of a registered scene has been completed, the corresponding table is emptied so that a new scene number designated for transfer can be registered.

Also, the number of file number registration tables is determined in accordance with the maximum number of files that constitute one scene. In the example shown in FIG. 5B, there are three file number registration tables, and three file numbers can be registered for each scene.

Note that the number of scene numbers and file numbers that can be registered can be changed as appropriate in accordance with a user setting or the file system.

Transfer List Registration Processing

Next, transfer list registration processing performed by the video camera of the present embodiment will be described with reference to FIGS. 4A to 6.

Figure 6:
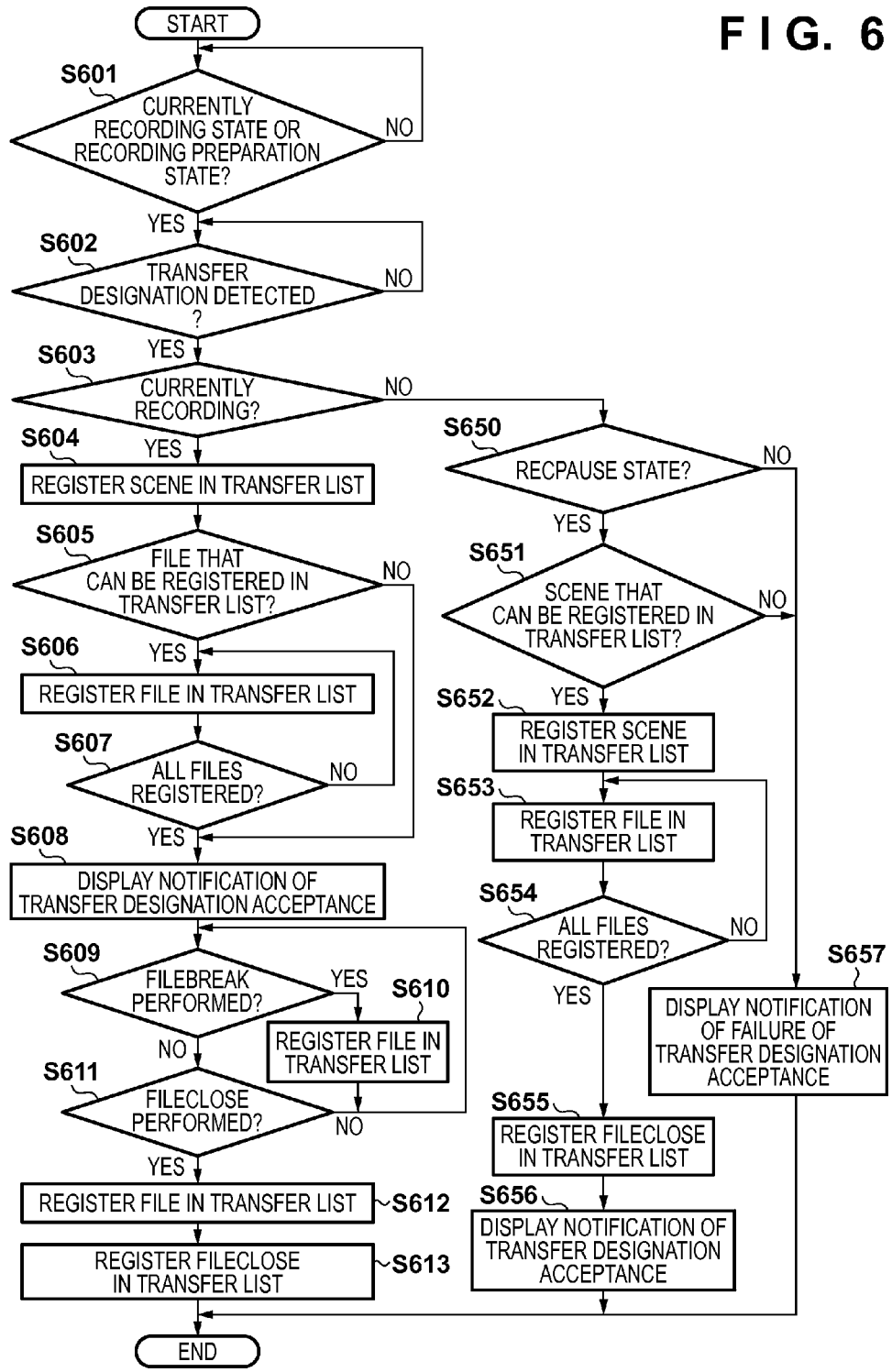
FIG. 6 is a flowchart showing transfer list registration processing according to the first embodiment.

Note that the processing shown in FIG. 6 is started when the operating mode of the video camera 100 is set to the video recording mode, and is realized by a program stored in the non-volatile memory 105 being read out to the memory 104 and executed by the system control unit 113.

Note that asynchronously with the processing shown in FIG. 6, the user can switch the operating mode of the video camera 100 to the recording mode via the operation unit 108, and can arbitrarily shift to the recording preparation state and the currently recording state. In FIGS. 4A to 4E, a switch to the recording mode is executed at ModeStart, a shift to the currently recording state is executed at RecStart, and a shift to the recording preparation state is executed at RecStop.

If a transfer designation (TransferReq) from the operation unit 108 is detected in the currently recording state or the recording preparation state after recording completion in the video camera 100, the system control unit 113 determines whether or not FileBreak has been performed on the transfer target scene. Then the transfer target scene number and file numbers resulting from FileBreak are recorded to the file number registration table. The system control unit 113 transfers the scene to the external apparatus in accordance with the transfer list registered in this way.

In step S601, the system control unit 113 waits until the video camera 100 shifts to the recording preparation state or the currently recording state, and advances to step S602 if a switch to either of these states occurs.

In step S602, the system control unit 113 waits until a transfer designation from the operation unit 108 is detected, and advances to step S603 if a transfer designation is detected. Whether or not a transfer designation was given is determined based on whether or not TransferReq 4012, 4112, 4212, 4312, or 4412 shown in FIGS. 4A to 4E was detected.

In step S603, the system control unit 113 determines whether or not the video camera 100 is in the currently recording state, advances to step S604 in the case of the currently recording state, and otherwise advances to step S650.

Currently Recording State

In step S604, the system control unit 113 registers the scene number of the scene that is to be transferred in the scene number registration table.

The following describes scene information registration processing in step S604 taking the example of the case where Scene#1 currently being recorded in FIGS. 4A and 5B is designated for transfer.

At the time when TransferReq 4012 in FIG. 4A is detected, the first scene is currently being recorded, and therefore the list in FIG. 5B is entirely "unregistered". When TransferReq 4012 is detected in step S602, the system control unit 113 registers, in a scene number registration table 5100 shown in FIG. 5B, the scene number of the scene being recorded at the time when the transfer designation was made. In this example, Scene#1 (4006) in FIG. 4A is registered in the scene number registration table 5100 in FIG. 5B. In similar processing, in accordance with TransferReq 4212 and 4312 given in the currently recording state, Scene#3 (4206) in FIG. 4C is registered in a scene number registration table 5320 in FIG. 5D. Also, Scene#4 (4306) in FIG. 4D is registered in a scene number registration table 5530 in FIG. 5F.

In step S605, the system control unit 113 determines whether or not a file that can be registered in the transfer list exists, advances to step S606 if a file that can be registered exists, and otherwise advances to step S608. The system control unit 113 manages information regarding the scene currently being recorded. The scene information includes information on the files constituting the scene, and the system control unit 113 can determine whether the scene is comprised of multiple files resulting from FileBreak. In FIG. 4A, at the time TransferReq 4012 is detected, File#1 (4007) is in an incomplete state and cannot be registered in the transfer list. The same applies with File#3 (4207a) in FIG. 4C as well. In this case, a file that can be registered in the transfer list does not exist, and therefore the processing advances to step S608. On the other hand, when TransferReq 4312 is detected in FIG. 4D, File#6 (4307b) is incomplete, but File#5 (4307a) is already in the completed state due to FileBreak 4310, and thus can be registered in the transfer list. In this case, a file that can be registered in the transfer list exists, and therefore the processing advances to step S606.

In step S606, the system control unit 113 registers the file numbers of files that can be registered in the transfer list.

The following describes file information registration processing in step S606 taking the example of the case where the scene currently being recorded in FIGS. 4D and 5F is transferred to an external apparatus.

Before TransferReq 4312 in FIG. 4D is detected, Scene#1, Scene#2, and Scene#3 have already been registered in scene number registration tables 5500, 5510, and 5520 in FIG. 5F. Then, when TransferReq 4312 in FIG. 4D is detected, Scene#4 (4306) is registered in scene number registration table 5530 in which no file number was registered, and File#5 (4307a) is registered in file number registration table 5531.

In step S607, the system control unit 113 repeatedly executes file information registration processing in step S606 until the file numbers of all of the files that can be registered in the transfer list have been registered. In FIG. 4D, only File#5 is a file that is in the completed state when TransferReq 4312 is detected. However, the case where multiple files have been generated due to FileBreak is also conceivable, and therefore it is determined whether or not all of the file numbers have been registered in step S606.

In step S608, the system control unit 113 notifies the user that TransferReq was accepted (step S602), and that all of the file numbers have been registered in the transfer list (step S607) by displaying messages to that effect on the display unit 112.

In step S609, the system control unit 113 determines whether or not FileBreak was performed on the file included in the scene currently being recorded, advances to step S610 in the case where FileBreak was detected, and advances to step S611 in the case where FileBreak has not been detected. This corresponds to FileBreak 4210 in FIG. 4C, FileBreak 4310 in FIG. 4D, and FileBreak 4410 in FIG. 4E.

In step S610, the system control unit 113 registers, in the corresponding file number registration table and in the transfer list, the file number of the file generated by the FileBreak that was detected in step S609. When FileBreak 4210 is detected in FIG. 4C, File#3 (4207a) is registered in the transfer list in step S610.

The following describes transfer list update processing with reference to FIG. 5D. Before the processing of step S610, the transfer list is in the state in which Scene#1 and Scene#2 have been registered in scene number registration tables 5200 and 5210 as shown in FIG. 5C. In this case, when FileBreak is detected in step S609, the system control unit 113 acquires the file number of the file that was completed due to FileBreak, and registers the acquired file number in file number registration table 5321 in FIG. 5D. In this example, File#3 (4207a) is registered in FIG. 4C. Thereafter, the recording of Scene#3 continues, and File#4 that is completed due to the second FileBreak is registered in file number registration table 5422 in FIG. 5E. In similar processing, File#5 (4307a) that is completed due to File-Break 4310 in FIG. 4D is registered in file number registration table 5531 in FIG. 5F. Thereafter, the recording of Scene#4 continues, and File#6 that is completed due to the second FileBreak is registered in file number registration table 5632 in FIG. 5G.

In step S611, the system control unit 113 determines whether FileClose was performed, advances to step S612 if FileClose was detected, and returns to step S609 if FileClose has not been detected. If a RecStop operation is accepted from the operation unit 108, the system control unit 113 performs FileClose on the file currently being recorded. This corresponds to FileClose 4009 in FIG. 4A and FileClose 4409 in FIG. 4E.

In step S612, the system control unit 113 registers the file number of the file completed due to FileClose in the corresponding file number registration table. In FIG. 4A, File#1 (4006) is put in the completed state by FileClose 4009 and thus can be registered in the transfer list, and File#1 (4007) is registered in file number registration table 5101 in FIG. 5B in which no file had been registered at that time. In similar processing, File#8 (4407b) is put in the completed state by FileClose 4409 in FIG. 4E, and File#8 (4407b) is registered in file number registration table 5742 in FIG. 5H.

After FileClose was detected and the file number was registered in the transfer list, in step S613, the system control unit 113 registers information indicating the completion of the scene in the transfer list. In FIGS. 5B, 5C, and 5H, FileClose is registered in file number registration tables 5102, 5212, and 5743.

Recording Preparation State

If the video camera 100 is not in the currently recording state when transfer designation is detected in step S602 (NO in step S603), the processing advances to step S650, in which the system control unit 113 determines whether or not the video camera 100 is in the recording preparation state. The processing advances to step S651 in the case of the recording preparation state, and otherwise advances to step S657. RecPause 4102 in FIG. 4B and RecPause 4402 in FIG. 4E correspond to the recording preparation state.

In step S651, the system control unit 113 determines whether or not a scene that can be registered in the transfer list exists, advances to step S652 if a scene that can be registered exists, and otherwise advances to step S657. The system control unit 113 controls the recording of video files to the recording medium 110, and therefore can determine whether or not a scene that was recorded immediately before exists.

In step S652, the system control unit 113 registers the scene number of the scene that can be registered in the transfer list.

The following describes scene information registration processing in step S652 taking the example of the case where the scene for which recording was completed in FIGS. 4B and 5C is transferred to an external apparatus in the subsequent recording preparation state.

When TransferReq 4112 is detected in FIG. 4B, Scene#2 (4106) for which recording is complete is registered in scene number registration table 5210 in FIG. 5C. In similar processing, when TransferReq 4412 is detected in FIG. 4E, Scene#5 (4406) for which recording is complete is registered in scene number registration table 5740 in FIG. 5H.

In step S653, the system control unit 113 registers the file numbers of files that can be registered in the transfer list, similarly to the processing of step S606.

The following describes file information registration processing in step S653 taking the example of the case where the scene for which recording is complete in FIGS. 4B and 5C is transferred to an external apparatus.

Before TransferReq 4112 is detected in FIG. 4B, Scene#1 has been registered in scene number registration table 5100 in FIG. 5B, File#1 has been registered in file number registration table 5101, and FileClose has been registered in table 5102. When TransferReq 4112 is detected in FIG. 4B, Scene#2 (4106) is registered in scene number registration table 5210 in which no scene number had been registered in FIG. 5C. Also, File#2 (4107) is registered in file number registration table 5211, and FileClose is registered in table 5212. In similar processing, Scene#1 to Scene#4 have already been registered in FIG. 4E, and when TransferReq 4412 is detected in FIG. 4E, Scene#5 (4406) is registered in scene number registration table 5740 in FIG. 5H. Also, File#7 and File#8 (4407a and 4407b) are respectively registered in file number registration tables 5741 and 5742, and FileClose is registered in table 5743.

In step S654, the system control unit 113 repeatedly executes file information registration processing in step S653 until the file numbers of all of the files that can be registered in the transfer list have been registered, similarly to step S607. In FIG. 4E, File#7 and File#8 (4407a and 4407b) are in the completed state when TransferReq 4412 is detected. In this case, when the processing of step S653 is performed the first time, File#7 (4407b) is registered, and File#7 is registered in table 5741 in FIG. 5H. However, since it is determined that File#8 (4407b) had not been registered in step S654, the processing of step S653 is performed again, and File#8 (4407b) is registered in table 5742 in FIG. 5H.

In step S655, the system control unit 113 registers FileClose, which indicates the completion of the scene, similarly to step S613. In this case, the video camera 100 is in the recording preparation state, and only the scene that was already subjected to FileClose exists, and therefore processing for monitoring FileClose as in step S611 is not performed. When TransferReq 4112 is detected in FIG. 4B, FileClose is registered in table 5212 in FIG. 5C. Also, when TransferReq 4412 is detected in FIG. 4E, FileClose is registered in table 5743 in FIG. 5H.

In step S656, similarly to step S608, the system control unit 113 notifies the user that a TransferReq was accepted (step S602) and that the scene number and file numbers have all been registered in the transfer list (step S654), by displaying messages to that effect on the display unit 112.

In step S657, the system control unit 113 notifies the user that transfer list registration processing failed. For example, a message is displayed on the display unit 112 to notify the user that a transfer designation was accepted from the operation unit 108, but a scene that can be registered in the transfer list did not exist, and file transfer processing will not be carried out.

Thereafter, transfer list registration processing is ended.

File Transfer Processing

Next, processing in which the video camera 100 of the present embodiment transfers video files in accordance with the transfer list will be described with reference to FIG. 7.

Figure 7:
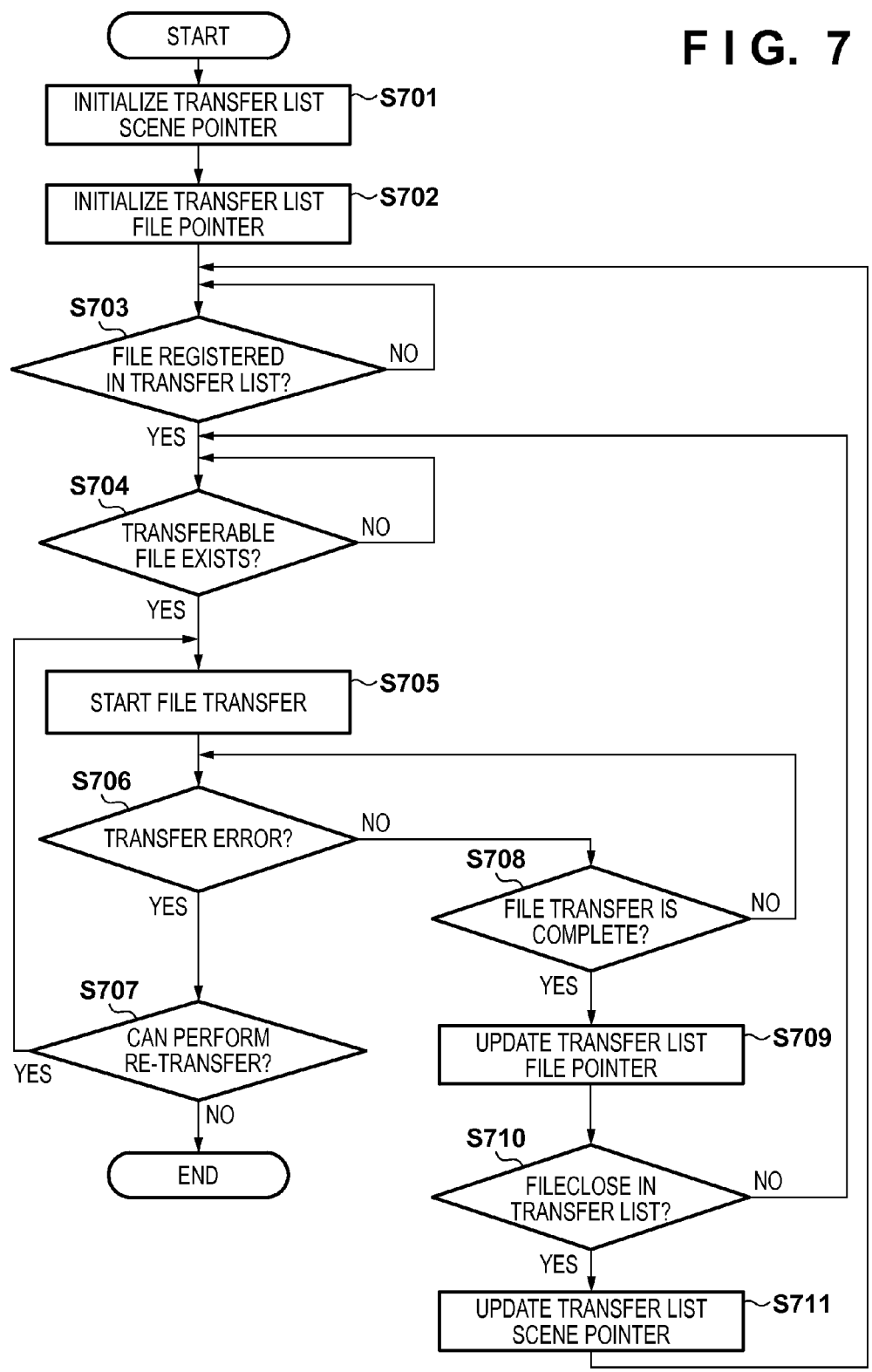
FIG. 7 is a flowchart showing file transfer processing according to the first embodiment.

Note that the processing shown in FIG. 7 is started when the operating mode of the video camera 100 is set to the video recording mode, and is realized by a program stored in the non-volatile memory 105 being read out to the memory 104 and executed by the system control unit 113.

Hereinafter, the system control unit 113 transfers the files constituting a scene to an external apparatus in accordance with a transfer list that was generated upon receiving a transfer designation from a user as described with reference to FIG. 6.

In step S701, the system control unit 113 initializes a scene pointer indicating the scene registered in the transfer list.

In step S702, the system control unit 113 initializes a file pointer indicating the files registered in the transfer list.

In step S703, the system control unit 113 determines whether or not files are registered in the transfer list, advances to step S704 if registered files exist, and, if registered files do not exist, again determines whether or not registered files exist.

In step S704, the system control unit 113 determines whether files that are registered in the transfer list and can be transferred to an external apparatus exist, advances to step S705 if transferable files exist, and, if transferable files do not exist, again determines whether transferable files exist.

In step S705, the system control unit 113 starts the transfer of the files that are registered in the transfer list and can be transferred to the external apparatus.

In step S706, the system control unit 113 determines whether a transfer error occurred, advances to step S707 if a transfer error occurred, and advances to step S708 if a transfer error has not occurred.

In step S707, the system control unit 113 determines whether the file for which the transfer error occurred can be re-transferred, and if it can be re-transferred, returns to step S705 and again transfers the file to the external apparatus.

In step S708, the system control unit 113 determines whether the file transfer that was started in step S705 is complete, advances to step S709 if the transfer is complete, and, if the transfer is not complete, returns to step S706 and again determines whether or not a transfer error has occurred.

In step S709, the system control unit 113 updates the transfer list file pointer since a file whose transfer was completed in step S708 exists.

In step S710, the system control unit 113 determines whether all of the files related to the scene currently being referenced in the current transfer list have been transferred, and the transfer list file pointer indicates "FileClose". If the file pointer indicates "FileClose", the processing advances to step S711. If the file pointer does not indicate "FileClose", the processing returns to step S704.

In step S711, the system control unit 113 updates the transfer list scene pointer and returns to step S703.

As described above, according to the present embodiment, operations related to processing for transferring video files that are currently being recorded or have been recorded can be performed immediately and easily.

Second Embodiment

Next, transfer list registration processing according to a second embodiment will be described with reference to FIGS. 8 and 9A to 9C.

The configurations and functions of the apparatus of the second embodiment are similar to the first embodiment, with the exception of a difference in transfer list registration processing performed when FileBreak is performed multiple times due to recording an extended-length video.

FIGS. 8 and 9A to 9C show states of shooting one scene comprised of multiple files generated by the FileBreak processing described with reference to FIG. 3 when recording an extended-length video.

Figure 8:
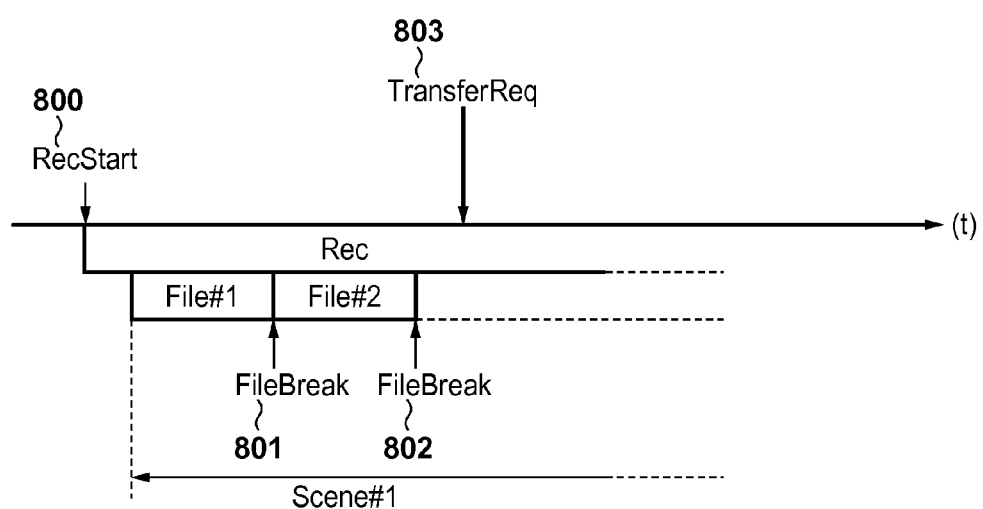
FIG. 8 is a timing chart showing transfer list registration processing according to a second embodiment.

In the second embodiment, as shown in FIG. 8, the recording operation is started by RecStart 800, FileBreak 801 and FileBreak 802 are performed during recording, and File#1 and File#2 are generated and recorded to the recording medium 110. Thereafter, a transfer designation (TransferReq 803) is detected during the generation of File#3, and Scene#1, File#1, and File#2 are registered in the transfer list.

Figure 9A:
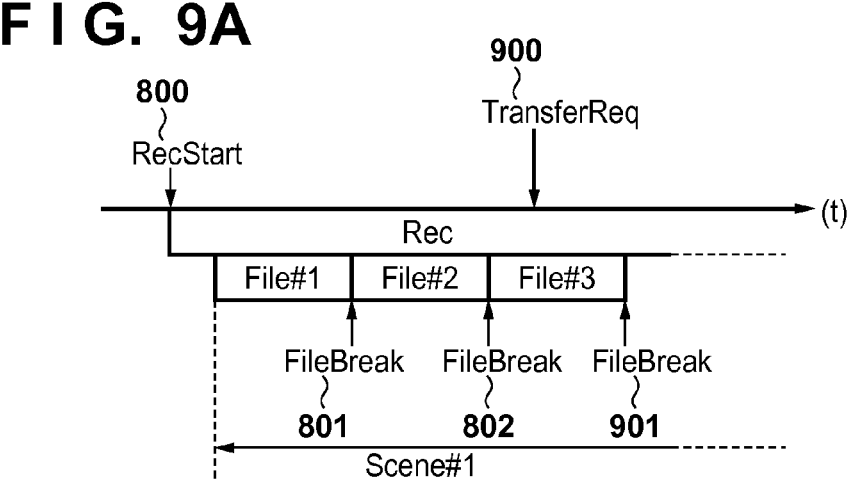
FIGS. 9A to 9C are timing charts showing transfer list registration processing according to the second embodiment.
Figure 9B:
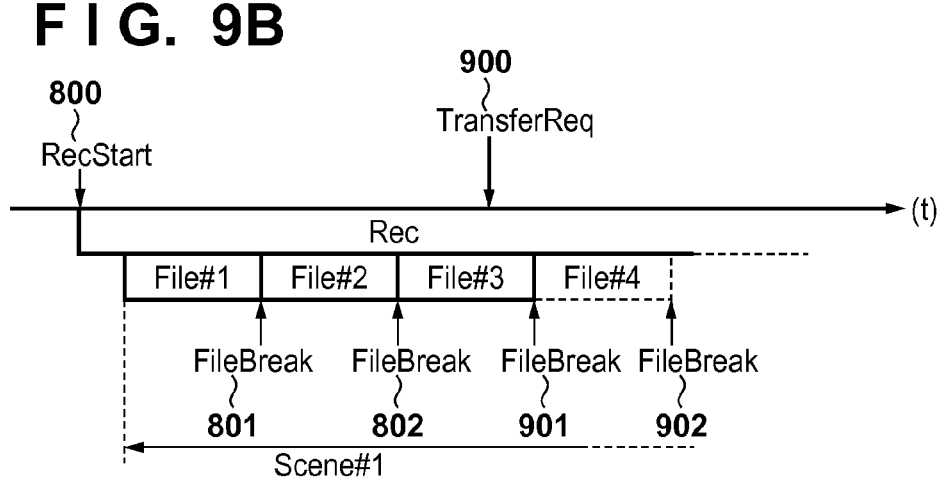
Figure 9C:
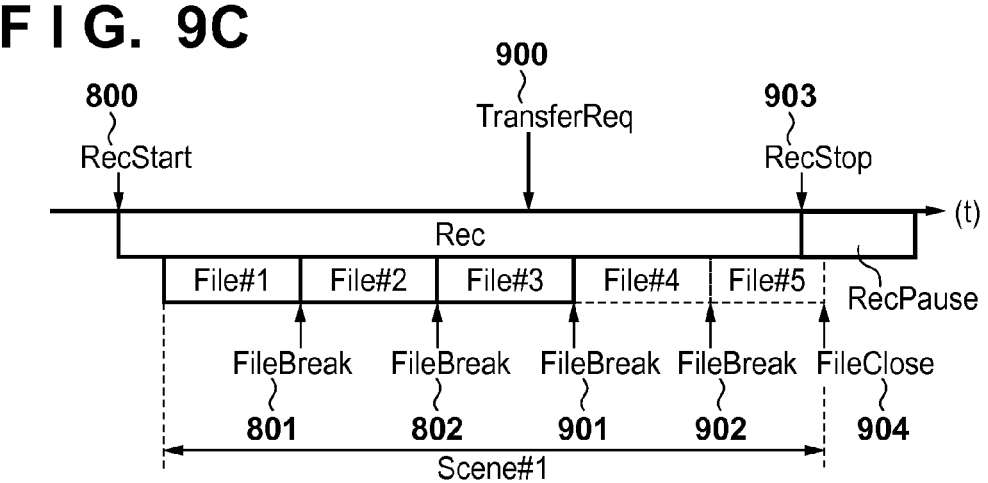

The following describes transfer list registration processing in the case where video recording continues from FIG. 8, and a transfer designation is performed during the generation of File#3, with reference to FIGS. 9A to 9C.

In FIG. 9A, when a transfer designation (TransferReq 900) is detected during the generation of File#3 due to FileBreak 802 in FIG. 8, the file registration order is updated such that File#3 is transferred first when Scene#1 is transferred. In this case, File#3 is registered at the first position in the file number registration table (e.g., table 5011) in which Scene#1 is registered in the scene number registration table (e.g., 5010) in the transfer list 5000 in FIG. 5A.

Note that if the transfer designation was detected immediately after the start of the generation of File#3, it is possible that the user performed the transfer designation with the intention of earlier transfer for the video captured immediately before the completion of the generation of File#2, for example. In this case, File#2 is registered at the first position in the file number registration table (e.g., table 5011) such that File#2 is transferred first. File#3 that is currently being generated is not registered until it is completed due to FileBreak 901.

Note that a configuration is possible in which in the case where a transfer designation is detected during the generation of File#3, File#2 is registered so as to be transferred first, and File#3 is not registered in the transfer list until the file size of File#3 reaches a predetermined proportion relative to the FB capacity according to which FileBreak is performed (e.g., reaches 2 GB, which is ½ of the FB capacity of 4 GB).

As shown in FIG. 9B, if a transfer designation is detected during the generation of File#3, but the recording operation continues even after the generation of the File#3 is complete, File#3 is registered at the first position in the file number registration table, and the file that is to be transferred next is registered as described below.

Specifically, after File#3 is generated, if a transfer designation is detected during the generation of File#4, or the generation of File#4 is completed due to FileBreak 902, File#4 is registered at the position subsequent to File#3 in the file number registration table such that File#4 is transferred subsequent to File#3.

As shown in FIG. 9C, if the recording operation is stopped due to RecStop 903 during the generation of File#5 due to FileBreak 902 after FIG. 9B, FileClose 904 is performed, and File#5 is completed. In this case, File#3, File#4, File#5, File#1, and File#2 are registered in the file number registration table in the stated order, and these files are transferred in the registered order when Scene#1 is transferred.

As described above, according to the present embodiment, in addition to the effects of the first embodiment, the order of transfer of files in a scene designated for transfer can be set to a desired order in accordance with the circumstances in which the user perform transfer designation, for example.

Third Embodiment

The following describes transfer list registration processing according to a third embodiment.

In the above-described embodiments, files generated using FileBreak as the trigger are added as transfer targets at the point in time when the files have been generated. In contrast, in the configuration of the present embodiment, even if files are generated due to FileBreak, the files are not added as transfer targets until RecStop is detected.

For example, in FIG. 9C, even if a transfer designation is detected at the timing of TransferReq 900, File#3 and File#4 are not added as transfer targets until RecStop 903 is detected.

According to this configuration, a series of files divided by FileBreak processing can be collectively added as transfer targets.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-076465, filed Apr. 2, 2014 which is hereby incorporated by reference herein in its entirety.

What is claimed is:

1. A recording apparatus comprising:
    a first input unit configured to accept an instruction for recording a moving image;
    a recording unit configured to record a moving image to a recording medium based on the instruction for recording a moving image;
    a communication unit configured to communicate with an external apparatus via a network;
    a second input unit configured to accept a predetermined transfer designation operation for transferring, using the communication unit, a moving image;
    a third input unit configured to accept an instruction for stopping moving image recording; and
    a control unit configured to select different moving image portions, which are generated by a predetermined recording process of the moving image, to be transferred to the external apparatus in accordance with an operation state of the recording apparatus at which the predetermined transfer designation operation is accepted,
    wherein
    in a case where the predetermined transfer designation operation is accepted by the second input unit during recording of a moving image by the recording unit, in response that the instruction for stopping the moving image recording is accepted by the third input unit and the moving image recording is completed after the predetermined transfer designation operation is accepted by the second input unit, the control unit selects a moving image portion which is sequentially generated by the predetermined recording process of the moving image and in which the predetermined recording process of the moving image is completed after the predetermined transfer designation operation is accepted and automatically transfers the selected moving image portion to the external apparatus, and
    in a case where the predetermined transfer designation operation is accepted by the second input unit while the recording unit is in a moving image recording preparation state, the control unit selects moving image portions that has been generated by the time of the acceptance of the predetermined transfer designation operation and automatically transfers the selected moving image portions to the external apparatus,
    the predetermined transfer designation operation accepted during recording of a moving image by the recording unit and the predetermined transfer designation operation accepted while the recording unit is in a moving image recording preparation state are operations for outputting the same instructions from the same operation member.

2. The apparatus according to claim 1, further comprising a generation unit configured to generate a list including therein information on a moving image portion that has been recorded or a moving image that is currently being recorded at a time when the predetermined transfer designation operation was accepted by the second input unit, wherein the control unit automatically transfers the recorded moving image portion to the external apparatus in accordance with the list.

3. The apparatus according to claim 2, wherein the recording unit performs filebreak processing as the predetermined recording process in which a captured moving image is divided into portions each time a predetermined file size is reached, and the portions are recorded as files, and the list includes therein information regarding a recorded moving image and information regarding files generated and recorded by the filebreak processing.

4. The apparatus according to claim 3, wherein in a case where the moving image is divided into a plurality of files and recorded in the filebreak processing, the control unit controls an order of transfer of the recorded moving image portions to the external apparatus.

5. The apparatus according to claim 4, wherein in a case where the predetermined transfer designation operation is accepted during recording of a moving image by the recording unit, the control unit controls the order such that a file being generated at a time when the predetermined transfer designation operation was accepted is transferred first.

6. The apparatus according to claim 4, wherein in a case where the predetermined transfer designation operation is accepted during recording of a moving image by the recording unit, the control unit controls the order such that a file that was completed immediately before a file being generated at a time when the predetermined transfer designation operation was accepted is transferred first.

7. The apparatus according to claim 3, wherein the information regarding a recorded moving image includes file identifiers that were generated and recorded in the filebreak processing, and a scene identifier of one scene comprised of all of the files.

8. A control method of a recording apparatus which has a first input unit configured to accept an instruction for recording a moving image, a recording unit configured to record a moving image to a recording medium based on the instruction for recording a moving image, a communication unit configured to communicate with an external apparatus via a network, a second input unit configured to accept a predetermined transfer designation operation for transferring, using the communication unit, a moving image, and a third input unit configured to accept an instruction for stopping moving image recording, the method comprising:

accepting the predetermined transfer designation operation with the second input unit; and selecting different moving image portions, which are generated by a predetermined recording process of the moving image, to be transferred to the external apparatus in accordance with an operation state of the recording apparatus at which the predetermined transfer designation operation is accepted, wherein in a case where the predetermined transfer designation operation is accepted by the second input unit during recording of a moving image by the recording unit, in response that the instruction for stopping the moving image recording is accepted by the third input unit and the moving image recording is completed after the predetermined transfer designation operation is accepted by the second input unit, selecting a moving image portion which is sequentially generated by the predetermined recording process of the moving image and in which the predetermined recording process of the moving image is completed after the predetermined transfer designation operation is accepted and automatically transferring the selected moving image portion to the external apparatus, in a case where the predetermined transfer designation operation is accepted by the second input unit while the recording unit is in a moving image recording preparation state, selecting moving image portions that has been generated by the time of the acceptance of the predetermined transfer designation operation and automatically transferring the selected moving image portions to the external apparatus, and the predetermined transfer designation operation accepted during recording of a moving image by the recording unit and the predetermined transfer designation operation accepted while the recording unit is in a moving image recording preparation state are operations for outputting the same instructions from the same operation member.

9. A non-transitory computer-readable storage medium storing a program for causing a computer to execute the control method of a recording apparatus which has a first input unit configured to accept an instruction for recording a moving image, a recording unit configured to record a moving image to a recording medium based on the instruction for recording a moving image, a communication unit configured to communicate with an external apparatus via a network, a second input unit configured to accept a predetermined transfer designation operation for transferring, using the communication unit a moving image, and a third input unit configured to accept an instruction for stopping moving image recording, the method comprising:

accepting the predetermined transfer designation operation with the second input unit; and selecting different moving image portions, which are generated by a predetermined recording process of the moving image, to be transferred to the external apparatus in accordance with an operation state of the recording apparatus at which the predetermined transfer designation operation is accepted, wherein in a case where the predetermined transfer designation operation is accepted by the second input unit during recording of a moving image by the recording unit, in response that the instruction for stopping the moving image recording is accepted by the third input unit and the moving image recording is completed after the predetermined transfer designation operation is accepted by the second input unit, selecting a moving image portion which is sequentially generated by the predetermined recording process of the moving image and in which the predetermined recording process of the moving image is completed after the predetermined transfer designation operation is accepted and automatically transferring the selected moving image portion to the external apparatus, in a case where the predetermined transfer designation operation is accepted by the second input unit while the recording unit is in a moving image recording preparation state, selecting moving image portions that has been generated by the time of the acceptance of the predetermined transfer designation operation and automatically transferring the selected moving image portions to the external apparatus, and the predetermined transfer designation operation accepted during recording of a moving image by the recording unit and the predetermined transfer designation operation accepted while the recording unit is in a moving image recording preparation state are operations for outputting the same instructions from the same operation member.

\* \* \* \* \*